US008608061B2

(12) United States Patent
Krajicek et al.

(10) Patent No.: US 8,608,061 B2
(45) Date of Patent: Dec. 17, 2013

(54) FINANCIAL INSTITUTION ACCOUNT-ASSOCIATED REWARDS PROGRAM

(75) Inventors: Gabriel Michael Krajicek, Austin, TX (US); Donald Gordon Shafer, Austin, TX (US); Shawn Chapman, Austin, TX (US); Paul Rudolph Barton, Round Rock, TX (US)

(73) Assignee: BancVue, Ltd., Austin, TX (US)

( * ) Notice: Subject to any disclaimer, the term of this patent is extended or adjusted under 35 U.S.C. 154(b) by 1120 days.

(21) Appl. No.: 12/167,034

(22) Filed: Jul. 2, 2008

(65) Prior Publication Data

US 2009/0006212 A1 Jan. 1, 2009

Related U.S. Application Data

(63) Continuation-in-part of application No. 11/553,716, filed on Oct. 27, 2006, now Pat. No. 7,753,264.

(60) Provisional application No. 60/958,924, filed on Jul. 10, 2007.

(51) Int. Cl.
*G06F 11/00* (2006.01)

(52) U.S. Cl.
USPC .... 235/380; 705/14.1; 705/14.18; 705/14.25; 705/14.27; 705/14.3

(58) Field of Classification Search
USPC .......................................................... 235/380
See application file for complete search history.

(56) References Cited

U.S. PATENT DOCUMENTS

| | | | |
|---|---|---|---|
| 5,732,400 A | 3/1998 | Mandler | |
| 5,774,870 A | 6/1998 | Storey | |
| 6,748,365 B1 * | 6/2004 | Quinlan et al. | 705/14.26 |
| 2002/0062249 A1 * | 5/2002 | Iannacci | 705/14 |
| 2002/0138343 A1 * | 9/2002 | Weatherford et al. | 705/14 |
| 2003/0093293 A1 | 5/2003 | Han | |
| 2003/0177084 A1 | 9/2003 | Cassani | |

(Continued)

OTHER PUBLICATIONS

"Community Foundation for Oak Park," last updated Aug. 13, 2008, www.oakparkfoundation.org.

(Continued)

*Primary Examiner* — Christopher Stanford
(74) *Attorney, Agent, or Firm* — Matheson, Keys & Kordzik PLLC; Jerry M. Keys

(57) ABSTRACT

A system and method of operating a rewards program through a financial institution for granting rewards to customers enrolled in the rewards program wherein the customer receives one or more reward credits in an account associated with the financial institution if the customer meets certain qualification criteria. The method may include determining if the account qualifies for an award credit; assigning a reward credit to the account; receiving purchase information regarding a purchase made at a merchant associated with the customer's account; identifying from the purchase information whether the purchase was made at a qualifying merchant; and applying the reward credit towards the purchase made by the customer at the qualifying merchant by applying a reward credit to the customer's account based upon the business rules applicable to the reward program. The method also determines if a reward credit has expired, in which event either the merchant or the financial institution may receive the benefit of any unused or expired reward credits depending on the particular embodiment of the reward program. The method also creates and provides notification to the customer of reward credit information.

31 Claims, 9 Drawing Sheets

(56) References Cited

U.S. PATENT DOCUMENTS

| | | | |
|---|---|---|---|
| 2003/0212595 A1* | 11/2003 | Antonucci | 705/14 |
| 2004/0034585 A1 | 2/2004 | Saunders | |
| 2006/0027647 A1 | 2/2006 | Deane | |
| 2007/0005416 A1* | 1/2007 | Jackson et al. | 705/14 |
| 2007/0181674 A1 | 8/2007 | Taylor | |
| 2008/0120155 A1 | 5/2008 | Pliha | |
| 2008/0210753 A1* | 9/2008 | Plozay et al. | 235/380 |

OTHER PUBLICATIONS

"RCB Bank Frequently Asked Questions," RCB Bank web page, Nov. 1, 2007, pp. 1-3, www.rcbbank.com/go/ebanking/frequently-asked-questions.

"Answers.com Electronic funds transfer," Anwers.com web page, Nov. 1, 2007, pp. 1-2, www.answers.com/topic/electronic-funds-transfer.

"Debits and credits," Wikipedia, the free encyclopedia, Nov. 1, 2007, pp. 1-2, http://en.wikipedia.org/wiki/Debit.

"Automated Clearing House," Wikipedia, the free encyclopedia, Nov. 1, 2007, pp. 1-4, http://en.wikipedia.org/wiki/Automated_Clearing_House.

"Compass Points," Apr. 21, 2008, /www.rewardsnow.com/compass/terms.htm.

"Bellwether Community CU," Apr. 21, 2008, www.bccu.org/interior.php/pid/3/sid/5.

"Juniper Visa Card," Apr. 21, 2008, www.store.apple.com/1-800-MY-APPLE/WebObjects/AppleStore?instantcredit=yes.

"Priority Club—The Points of Membership," May 5, 2008, www.ichotelsgroup.com/h/d/pc/1/en/c/2/content/dec/pc/0/en/benefits.html.

"Priority Club—Partners," May 5, 2008, www.ichotelsgroup.com/h/d/pc/1/en/c/2/content/dec/pc/0/en/partners/us.html.

"Priority Club—Earn Points/Miles," May 5, 2008, www.ichotelsgroup.com/h/d/pc/1/en/c/2/content/dec/pc/0/en/miles/us.html.

"Priority Club—Redeem Points," May 5, 2008, www.ichotelsgroup.com/h/d/pc/1/en/c/2/content/dec/pc/0/en/points/us.html.

"Priority Club—Brand Merchandise," May 5, 2008, www.ichotelsgroup.com/h/d/pc/1/en/c/2/content/dec/pc/0/en/points/us/bm.html.

"City National Bank Free Reward Checking," Nov. 5, 2007, www.cnbt.com/free-reward-checking-p-4.html.

"BancVue—The Solution," Nov. 5, 2007, www.bancvue.com/tour/solution.htm.

"Free Tunes Checking from Oregon Community Credit Union," Nov. 5, 2007, www.freetuneschecking.com.

"Free Tunes Checking Details," Nov. 5, 2007, www.freetuneschecking.com/details.php.

"Free Tunes Checking Requirements," Nov. 5, 2007, www.freetuneschecking.com/requirements.php.

"Free Tunes Checking Locations," Nov. 5, 2007, www.freetuneschecking.com/locations.php.

"Free Tunes Checking Terms," Nov. 5, 2007, www.freetuneschecking.com/terms.php.

"Wikipidia—Stored-Value Card," Nov. 6, 2007, http://en.wikipedia.org/wiki/Stored-value_card.

"Tuned-In Checking," Apr. 17, 2008, http://www.tunedinchecking.com/tune-in/tuned-in-checking-rewards.html.

"Tuned-In Checking," Apr. 17, 2008, http://www.tunedinchecking.com/tune-in/tuned-in-checking-requirements.html.

"Citibank iTunes Rewards," Apr. 21, 2008, http://www.citibank.co.uk/personal/cards/reward.htm?type=cards&merchant=citi&offer=.

"Starbucks card account terms and conditions," May 5, 2008, www.starbucks.com/card/canada_duetto_terms_english.asp.

"iTunes Store Gift Certificates terms and conditions," May 5, 2008, http://www.apple.com/legal/itunes/us/gifts.html.

* cited by examiner

FINANCIAL INSTITUTION ACCOUNT-ASSOCIATED REWARDS PROGRAM

CROSS-REFERENCE TO RELATED APPLICATIONS

This application claims priority pursuant to 35 U.S.C. 120 to co-pending and co-assigned U.S. patent application Ser. No. 11/553,716 filed Oct. 27, 2006, entitled "AUTOMATED REWARD SYSTEM" of which this application is a continuation-in-part application.

This application claims priority pursuant to 35 U.S.C. 119 to provisional U.S. Patent Application Ser. No. 60/958,924 entitled "SYSTEMS AND METHODS FOR PAYING AN ALTERNATE INTEREST ON INTEREST BEARING ACCOUNTS" filed Jul. 10, 2007.

The following co-pending and co-assigned application contains related information: U.S. patent application Ser. No. 12/148,111, entitled "METHOD AND SYSTEM OF FINANCING AND MANAGING, THROUGH A FINANCIAL INSTITUTION, A PLURALITY OF TRADE PAYABLES OF A BUYER", by inventors James Peil, et al, filed Apr. 16, 2008.

BACKGROUND OF THE INVENTION

The present invention relates in general to reward programs to encourage customer loyalty, and particularly to automated reward programs operated through a financial institution.

Rewards programs are conventionally offered by merchants to customers via coupons, points programs such as frequent flyer miles, and the like. Such a program may provide a customer an incentive to do repeat business with a merchant, thus creating customer loyalty.

Currently merchants offer discounts, such as with a coupon, or electronically, most often with a gift card or points card which the customer present to a merchant using a specific point of sale (POS) hardware and software provider that facilitates the reward program. Across multiple merchants, such a discount program would require establishment of a common POS infrastructure at all merchants or running separate programs inside each POS network, which is cumbersome to manage.

Some discount programs apply the discount at the time of purchase, such as by using "points", "miles", or other intangible currencies to reward a customer. Such programs provide less, if any, incentive for a customer to return compared to a program that provides discounts or credits on future purchases in dollars that are more easily appreciated, understood, and used by the customer.

Available discount programs that provide cash back rewards are not specific to a merchant, but rather have been specific to the type of card such as a Discover Card® program. Thus, there is a need for customer discount programs that provide rewards in dollars, allow merchants to tailor discounts offered, provide an incentive for the customer to repeat purchases, and reduce capital investment on the part of the merchant.

Financial institutions are also merchants that offer "reward" programs to their account customers, originally by the customer earning interest on an average balance during a given time period. More recent financial institution-oriented reward programs have the rewards tied to either a) balances kept at the financial institution; b) multiple accounts at the financial institution; or c) points earned for each credit/debit card purchase or transaction amount whereby the points may be used to purchase merchandise or downloads from specific stores, catalogs or websites.

For many financial institutions, such as community banks and credit unions, many of these "reward" programs are run by third party vendors whereby the financial institution contracts with the third party vendor to administer the financial institution's program. The financial institution has little, if any, input in neither the "rewards" offered nor the merchants where the rewards may be redeemed. The financial institutions do not have the flexibility of making changes, additions nor even deleting merchants where rewards can be redeemed.

Thus, the problems that limit the ability of many financial institutions to offer reward programs to their own customers in order to provide incentives to their customers to use more of the financial institution's services, thus creating customer loyalty to the financial institution include: (a) the inability of financial institutions to allow customer usage of earned "rewards" to make purchases at merchants selected by the financial institution without 1) creating a catalog or online site with selected merchandise and 2) having pre-arranged costly agreements with such merchants; (b) many large merchants do not want to deal with smaller financial institutions, such as community banks and credit unions, to offer "rewards" to their customers and members, respectively; (c) the inability of such financial institutions to have the flexibility of pre-determining the "rewards" and the merchants within an automated rewards system; (d) the inability of a financial institution to automatically keep the unused and expired rewards, i.e. "breakage", rather than the "merchant" or the third party vendor retained by the financial institution; (d) the costly equipment and software needed by a financial institution to operate a "rewards" program in-house; (e) the need to provide timely reports to the institution's customers of their "reward" usage and balances; (f) the present difficulties encountered by customers in redeeming their earned rewards; (g) the inability of a financial institution to offer a "reward" program based on a customer's account activity, not just the numbers of debit/credit card transactions and/or amounts; and (h) the inability for customers to transfer "rewards" to another account.

Thus, there is a need for financial institutions to set up and operate "reward programs" for their customers that use existing POS technology for specific customer markets which grants "rewards" that can be redeemed at any financial institution-designated merchants without costly, pre-arranged merchant agreements or interferences from the merchant or any other third-party and where the financial institution keeps the "breakage." There is also a need for reward programs where the financial institution provides its customers with timely and recurring information about their rewards account and activity; provides its customers with the right and ability to transfer earned rewards to another account, and makes it easy for its customers to redeem the earned rewards.

SUMMARY OF INVENTION

In the embodiments, a system, method, and computer program product useful in setting up and operating, through a financial institution, reward programs are disclosed.

In some embodiments, the invention provides for a method of operating a rewards program through a financial institution. The method includes enrolling a plurality of customers in the rewards program wherein the customer receives one or more reward credits in an account associated with the financial institution if the customer meets certain qualification criteria; determining if the account qualifies for an award credit; assigning a reward credit to the account if the account qualifies for an award credit; receiving purchase information regarding a purchase made at a merchant wherein the payment for the purchase is associated with the customer's account; identifying from the purchase information whether the purchase was made at a qualifying merchant; and applying the reward credit towards the purchase made by the customer at the qualifying merchant by applying a reward credit to the customer's account based upon the business rules applicable to the reward program. The method may further include determining if a reward credit has expired. The method may also include having the financial institution receive the benefit of any unused or expired reward credits. The method may limit the application of the reward credit toward a future purchase by the customer at a qualifying merchant. The financial institution may determine whether a merchant is a qualifying merchant and may select a qualifying merchant for a rewards program without entering into an agreement with the qualifying merchant or notifying the qualifying merchant. The financial institution sets the qualification criteria for when an account is entitled to a reward credit, and the qualification criteria for a reward credit may be based upon account activity. The financial institution may set the business rules applicable to the reward program for applying the reward credits.

In some embodiments, the invention provides for a system for operating a rewards program through a financial institution for granting reward credits to customers. The system may include a financial institution that receives, processes and stores information about its customers' accounts and account activity, including purchase information about purchases made at a plurality of merchants by customers who are enrolled in the rewards program through accounts associated with the financial institution; a merchant where a customer enrolled in the rewards program, makes a purchase wherein the payment for such purchase is associated with a customer account at the financial institution and the purchase information is received by the financial institution over a financial network; and a transaction module coupled to the financial institution for managing enrollment in and transactions associated with the rewards program. The transaction module may include a memory unit operable for storing a computer program for operating the rewards program; a processor coupled to said memory unit, wherein said processor, responsive to said rewards computer program, may include circuitry for determining if a customer's account is associated with the rewards program; circuitry for instructing the financial institution to credit the customer's account associated with the rewards program with one or more reward credits if the customer meets certain qualification criteria; circuitry for determining if the account qualifies for an award credit; circuitry for instructing the financial institution to assign a reward credit to the account if the account qualifies for an award credit; circuitry for receiving purchase information regarding a purchase made at a merchant which is associated with the customer's account; circuitry for identifying from the purchase information whether the purchase was made at a qualifying merchant; and circuitry for instructing the financial institution to apply a reward credit towards the purchase made by the customer at the qualifying merchant based upon business rules applicable to the reward program. The financial institution may credit a reward credit or debit a reward credit to the customer's account in response to instructions from the transaction module. The processor may further include circuitry that determines if a reward credit has expired. The processor may further include circuitry that creates a virtual account for tracking on an individual account basis the reward credits associated with each account associated with the rewards program, and the transaction module may further include circuitry that may debit a customer's virtual account if a reward credit is expired and credits the financial institution's virtual account for such expired credit.

The processor may further include circuitry that applies a reward credit only toward a future purchase by the customer at a qualifying merchant wherein the financial institution determines whether a merchant is a qualifying merchant. The financial institution may select a qualifying merchant for a rewards program without entering into an agreement with the qualifying merchant or notifying the qualifying merchant. The financial institution may also set the qualification criteria for when an account is entitled to a reward credit, which may be based upon account activity. The financial institution may set the business rules applicable to the reward program for applying the reward credits to purchases made by the customer.

In some embodiments, the invention provides for a computer program product containing program instructions for execution on a computer system in communication with a financial institution, which when executed by the computer system, causes the computer to perform any of the methods described above.

BRIEF DESCRIPTION OF DRAWINGS

For a more complete understanding of the present invention, and the advantages thereof, reference is now made to the following descriptions taken in conjunction with the accompanying drawings, in which:

FIG. 4b is a high level process flow diagram of the initial steps of the method for carrying out the reward program through a financial institution;

DETAILED DESCRIPTION OF THE ILLUSTRATIVE EMBODIMENTS

The principles of the present invention and their advantages are best understood by referring to the illustrative embodiments shown in FIGS. 1 through 5b.

In the following discussion and in the claims, the terms "including" and "comprising" are used in an open-ended fashion, and thus should be interpreted to mean "including, but not limited to . . . ". The term "customer" and "user" are used interchangeably herein and may be substituted for one another throughout. The term "financial institution" can be any entity that provides to a customer a means of payment for merchandise or services, including but not limited to, a bank, a credit union, a credit card company or other such entity that provides a means to make purchases. The term "financial network" can be any network whereby debits and credits are transferred between entities. The term "account" can be, but is not limited to, a physical account or a virtual account where credits and debits applied. Also, the term "couple" or "couples" is intended to mean either an indirect or direct electrical or communicative connection. Thus, if a first component couples to a second component, that connection may be through a direct connection, or through an indirect connection via other devices and connections. It is further noted that all functions described herein may be performed in either hardware or software, or a combination thereof, unless indicated otherwise.

Figure 1:
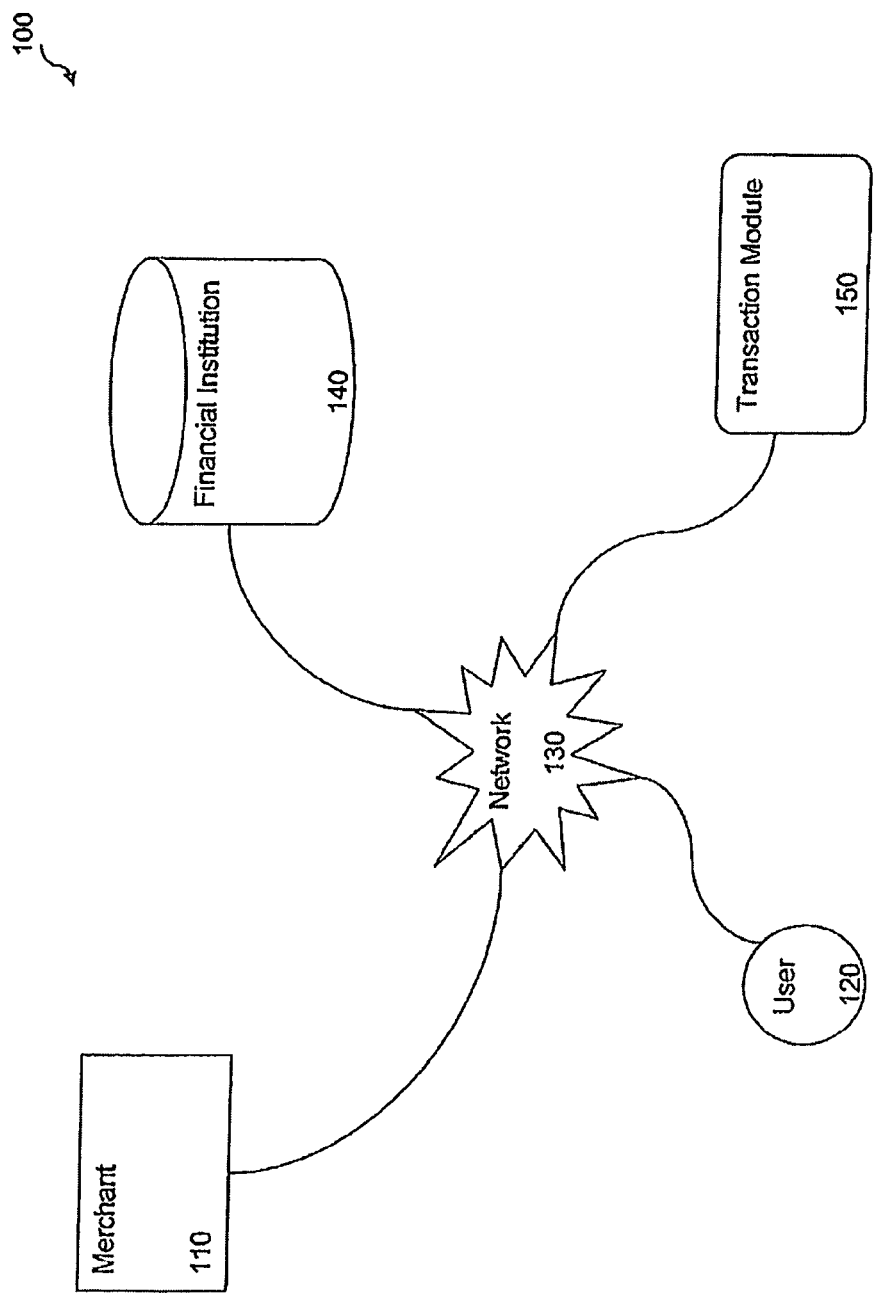
FIG. 1 is a block diagram representing a system in accordance with embodiments of the present invention.

In accordance with various embodiments of the present invention, FIG. 1 is a block diagram of a system 100 for providing an automated reward program through a financial institution. The system 100 includes a financial institution 140 that maintains data on a merchant 110 and user 120. In some embodiments, the merchant 110 may set the terms of a reward program for the user 120, also referred to as a "customer" for purposes of the present description, and the user/customer 120 makes purchases at the merchant 110. In other embodiments, the financial institution 140 may set the terms of a reward program for the user 120. Purchase information is processed and submitted to the financial institution 140 and/or the transaction module 150 from the merchant 110. In one embodiment, such information is submitted over a network 130, or across a plurality of networks (not shown), such as via the internet.

The transaction module 150 initially receives reward program settings from the merchant 110 and/or the financial institution 140, as will be described in more detail hereinafter. These reward program settings may be updated from time to time. If the rewards program is being offered by the financial institution to merchants for the primary benefit of the merchants, the reward program settings are primarily determined by the merchant and the merchant may pay for the reward credits. If the reward program is being offered by the financial institution for the primary benefit of the financial institution, the reward program settings are determined by the financial institution and the financial institution may pay for the reward credits. The settings are not typically transmitted with each purchase. The transaction module 150 receives purchase information from the merchant 110 via a financial network(s) when a customer 120 makes a purchase. The transaction module 150 generally tracks and maintains transactions and data associated with the reward program for purchases that are made by customers enrolled in the reward program. For example, the transaction module 150, possibly in conjunction with the financial institution operating and maintaining the automated reward program, the merchant's separate financial institution (thus possibly requiring ACH instructions), the merchant, and an electronic funds transfer (EFT) provider, identifies an enrolled user and enrolled merchant from purchase information when the user makes a purchase at the merchant. Additionally, the transaction module 150 confirms from the purchase information a reward program common to the user and merchant, and assigns a credit to the user for future use at the merchant (or, based on a plurality of purchases by a plurality of users at a plurality of merchants, assigns a plurality of credits to the plurality of users for future use at a plurality of merchants) based on the terms of the reward program. Upon a future visit to the merchant, or in some embodiments, at another pre-defined merchant, after assignment of a credit to the customer/user, the assigned credit is attributed towards the future purchase at the merchant, or a plurality of merchants. The assignment of credits and attribution of the credits towards future purchases may be repeated on an ongoing basis. It should be noted that rewards earned may be shared across merchants in that merchants may be linked together for the rewards program. Credits may also be credited to a customer selected account that is different from the account from which the purchase was made, thereby providing the ability for customers to transfer rewards between accounts.

Suitable financial institutions include but are not limited to community banks, credit unions, and credit card companies. The customer buying goods and/or services from merchants typically enters into an agreement with the financial institution pursuant to which it establishes a conventional checking account or other type of account from which payments to merchants may be debited. The system, method and program product can be employed by financial institutions that employ core processor solutions as hereinafter described without being a part of the core processor solution.

Some large financial institutions maintain their own proprietary data processing systems that reconcile and manage accounts, including providing the proper amount of interest to each customer or account holder at the financial institutions. Many community banks, however, do not develop their own data processing software and/or operate their own data processing systems for reconciling and managing accounts for their customers, including providing the proper amount of interest paid or accrued to the account. Instead, such banks utilize third-party "core processing" solutions. A "core processor" is a term of art in the financial services industry. The term refers to a data processing system that specializes in account transaction reconciliation, including but not limited to matching debit and credit transactions from activities such as cashing and writing checks, point-of-sale (POS) debits, and money transfers for an account holder at a financial institution.

The third party core processors may facilitate core processing services to the financial institution by either (1) licensing the core processor software to the financial institution which operates the core processor software "in-house", meaning the software is hosted and operated at the financial institution's own data center, or (2) the core processing software is operated by the core processor in a "service bureau" environment, meaning the software is hosted remotely from the financial institution or its data center at a managed hosting facility operated by a provider (the core processor or a third party licensee) that typically provides core processing services to more than one financial institution. Unless the context indicates otherwise, for purposes of this application, "core processor", "core processing", and other similar terms are intended to cover (i) inhouse-operated third party core processing software, (ii) third party "service bureau" core processing services, and (iii) financial institution "core processor-like" proprietary data processing systems located in the financial institutions' data centers. A third-party information provider that can read transaction information, such as an internet banking solutions provider, may also be involved in the process In some embodiments, the transaction module 150 is fully and seamlessly integrated with the core processor databases and systems of the financial institution 140. Thus, the transaction module may be a part of the financial institution core processing operations. Alternately, the transaction module 150 may be a separate computer system operated by the financial institution at its office or other location and coupled to the financial institution's core processor. The transaction module 150 may also be a separate computer system operated by a separate party in conjunction with the financial institution 140 wherein the third party provides application service provider ("ASP") or service bureau services to the financial institution 140. Thus, use of the term "transaction module" is for descriptive purposes only as used in the present application in order to indicate databases, systems, methods, hardware, and software necessary to carry out the present invention, in addition to conventional databases, systems, methods, hardware, and software employed by a financial institution or a plurality of financial institutions.

Figure 2:
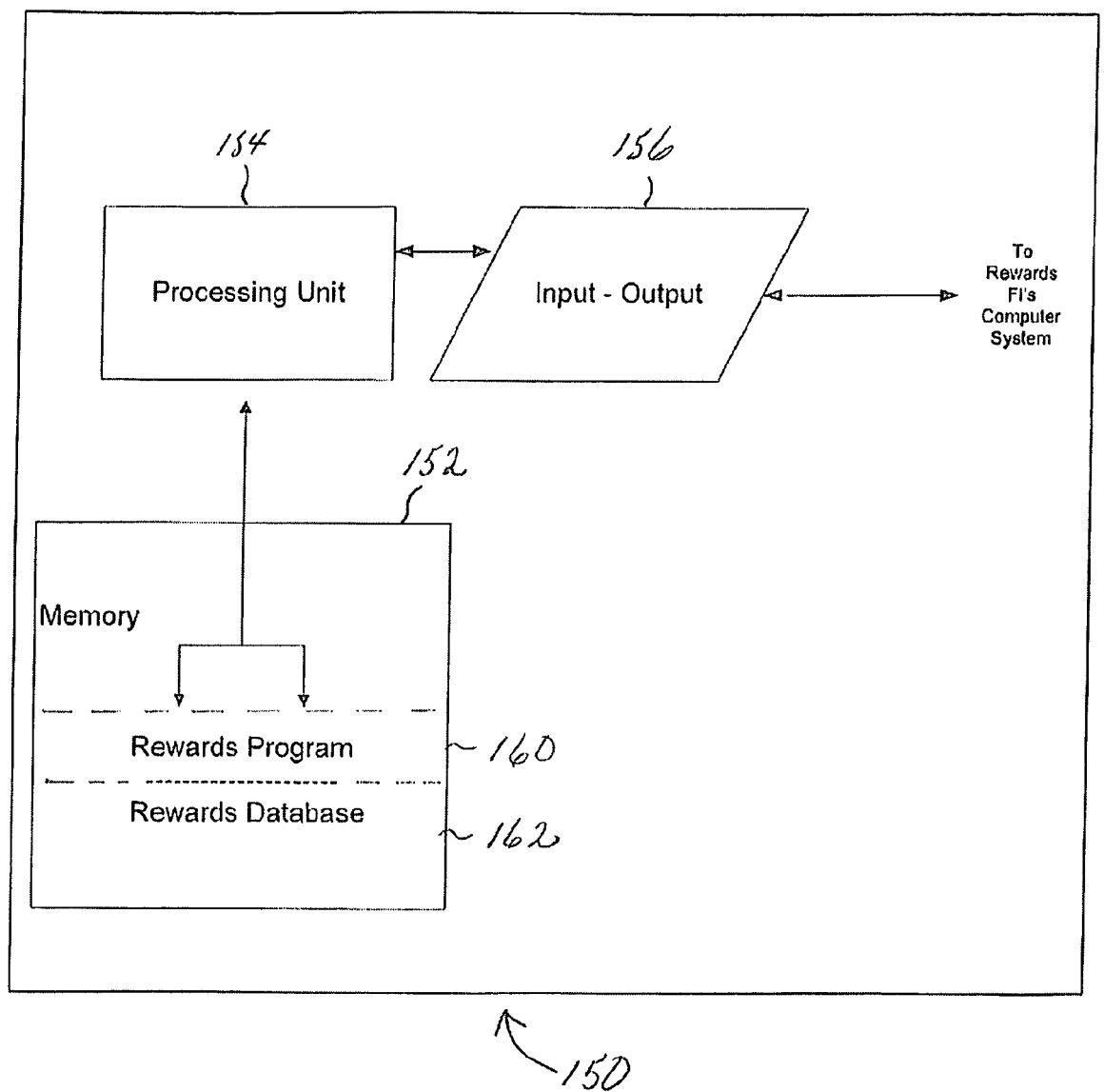
FIG. 2 is a block diagram illustration of an embodiment of a reward program transaction module or system that is a component of the overall system of FIG. 1 for operating, through a financial institution, reward programs.

Referring now to the drawings relating to embodiments directed at reward programs set up by the financial institution, FIG. 2 depicts an embodiment of a reward program transaction module 150 configured as a standalone computer system, which is useful in the operation of reward programs through a financial institution 140. The transaction module 150 includes a memory 152 for storing applications that are executed by a processing unit 154. In particular, a novel "reward programs" application program 160 may be stored in memory 152 for carrying out various steps of the method of the present invention described hereinafter. Memory 152 also stores tables or other data needed by the computer instructions of the reward programs application program 160 in a database 162 and stores the computations made by the program in the database 162. The information needed to be initially stored in the database by the application program 160 includes bank identifying information such as name and address, customer identifying information, such as names, addresses, account names and numbers, and other required setup data.

Input/output devices 156 from the transaction module or computer system 150 transmit and receive information to and from other either local or remote computer systems needed to obtain all the additional information necessary for the application program 160 to determine and carry out the reward programs processes.

In many embodiments a payment device or other mechanism (not shown), such as a debit or credit card, issued by the financial institution 140 is employed by a customer 120 to make purchases at the merchant 110. Such a payment device may be used at any merchant. Data from the payment device is submitted with purchase information to the financial institution 140 for debiting funds from the customer's account at the financial institution. The transaction module 150 detects the purchase information and data from the payment device and, if the customer and merchant are both enrolled in the reward program, confirms a reward program common to the customer and merchant, and assigns the appropriate credit to the customer's account at the financial institution such that the credit can be applied towards future purchases at the merchant or other pre-defined merchants.

In various embodiments, the financial institution offers the program to merchants (other than itself) and customers. The merchants and customers may enroll in the program, such as, for example, by registering on a web site over the internet, over the phone, or in person at a financial institution location. The customers typically establish and/or maintain a conventional checking or other type of account at the financial institution from which payments to merchants are debited. In several embodiments, upon enrolling in the automated reward program, a customer may automatically receive notifications of reward programs offered by merchants participating in a reward program operated through the financial institution. The program may also offer merchants the opportunity to send notices of reward programs, such as for promotional purposes, to enrolled customers. In some embodiments, upon making a purchase upon which a credit for future purchases has been created, the user may receive notifications of the credit created. Similarly, in some embodiments, upon making a purchase for which a previously earned credit will be applied and credited to the customer, the customer may receive notice that the credit has been applied.

Merchant accounts may be set up and merchant transactions may be carried out with any number of arrangements as the financial institution and merchant agree. Depending on the merchant's credit worthiness, a reserve account may be required by the financial institution, in addition to an operating account, in order for the merchant to participate in the automated reward program. Thus, as a non-limiting example, a credit may be pulled from a merchant's operating account to the merchant's reserve account in order to ensure the availability of the credit amount to be attributed to a customer. In another example, a merchant may be required to maintain a minimum amount, such as based on credit worthiness, historical data, standard commercial practices, and the like, in the reserve and/or operating account in order to participate in the automated reward program. Additionally, the merchant may not be required to maintain accounts at the financial institution maintaining the automated reward program as long as ACH debit permissions are granted to the maintaining financial institution by the financial institution at which the merchant maintains an operating and/or reserve account, and may have the account automatically debited a set number of days prior to rewarding the credit to the customer. Alternately, the maintaining financial institution may require the merchant to set up either a reserve account or a line of credit at that financial institution even though the maintaining institution may have ACH debit permissions granted to receive payments from the merchant's account at a foreign financial institution.

Additionally, the transaction module 150 will track and maintain merchant and customer transactions and data as related to the common automated reward program. Thus, whether the transaction module is integrated with the financial institution or separately, it may be coupled to the financial institution's databases and systems in order to carry out the automated reward program.

The merchant and customer may enroll in the automated reward program in various ways, such as, on a web site over the internet, by a mobile device or through the financial institution's physical facilities. The enrollment may include setting up accounts for the merchant and customer, if such accounts are not already established and, if such an account is already established, registering that account in the reward program. Additionally, when the financial institution is operating the award program primarily for the merchant's benefit, the automated reward program permits the merchant to set the terms of the reward program. The merchant may independently, or in conjunction with the financial institution, tailor the automated reward program to the merchant's needs, such as by tying rewards to specific items, customer enrollment date, time limitations within which credits must be utilized (thereby encouraging more frequent shopping), categories of items, varying rewards per time (day, hour, month), and so on. Each merchant may set its own account with reward terms tailored to that merchant. Thus, the automated reward program permits a financial institution to provide a reward program to a plurality of merchants, where each merchant is able to set its own reward program terms per the merchant's unique needs, or together as one merchant. The merchant may only offer a reward program within a limited geographical area or, if the merchant has multiple outlets, the reward program may be offered nationwide.

By way of non-limiting example, consider a reward amount offered by an enrolled merchant of twenty percent (20%) of total customer purchases. A customer enrolled in the automated reward program makes a one hundred dollar ($100) purchase at the merchant with the payment device issued by the financial institution. The 20% reward on the $100 purchase accrues twenty dollars ($20) to the customer. This occurs by the transaction module identifying the customer, merchant, and dollar amounts from the purchase information received by the financial institution through customary daily transaction processing. This may require the transaction model to access the database of the financial institution and/or an electronic funds transfer (EFT) provider coupled to the financial institution. The transaction module identifies the merchant as providing a reward program, identifies the customer as enrolled in the merchant's reward program, identifies the terms of the reward program, and applies the terms to the customer's purchase, thus in this case assigning $20 as credit to the customer that can be applied towards future purchases at the merchant.

The customer may be notified, such as automatically via e-mail, text message or any other suitable electronic, mobile or other means, of the $20 credit awarded to the customer because of the purchase. In some embodiments, the customer may not yet be enrolled in the merchant's reward program and may receive a communication that provides notice of the availability of the credit, and further explanation of the reward program, if the customer will enroll.

Later, the customer makes a $50 purchase at the same merchant. Assuming the customer is already enrolled in the program, the $20 credit, or some other amount determined by the merchant, earned from the previous purchase will be applied towards the $50 purchase so that the cost of the $50 purchase after the credit is only thirty dollars ($30). The merchant may, in the merchant's discretion, elect to designate that the amount earned from the previous purchase to be applied toward the $50 purchase be capped at some maximum dollar amount or at some percentage of the value of the $50 purchase. In some embodiments, initially, upon the merchant posting the purchase information, the full $50 purchase may be shown as debited from the customer's account at the financial institution. Then, for example, at a predetermined time each day or at the end of a "cycle", after a purchase is made, the transaction module may apply the $20 credit to the customer's account so that the $50 debit is reduced by the credit amount. Thus for a merchant providing a plurality of rewards to a plurality of customers on the same day, the financial institution and transaction module may carry out debiting and crediting of the customers' accounts at the same time, thus coordinating reconciliation of the merchants' and customers' accounts.

As before when a "reward" credit was assigned to the customer, the customer may receive another communication indicating application of the $20 credit to the subsequent purchase to reduce the amount debited from $50 to $30. Additionally, the $50 purchase may cause assignment of another "reward" credit to the customer from the merchant based on the $50, which at 20% is ten dollars ($10). Alternatively, the merchant may set the terms of the reward program such that the reward amount for the subsequent purchase is based on the discounted amount, which in this case would be the $30, thus resulting in the assignment of credit for the $50 purchase of $50−$20=$30; and $30 times 20% is six dollars ($6). Thus, if the reward amount for the subsequent purchase is based on the discounted amount, the next available amount to be credited towards the next subsequent purchase by the customer at the participating merchant is $6. Of course, as previously discussed, the amount could be capped—either as a dollar amount or as a percentage of the $50 sale. The method, including assigning credit for a purchase and attributing the credit towards a subsequent purchase, may be repeated as desired by the merchant to provide rewards for customer purchases.

The merchant may further vary the terms of the reward program operated for its benefit such as by limiting the discount to only apply to the initial purchase, only to purchases that exceed some minimum amount, and so on. The merchant and financial institution can tailor and subsequently modify the merchant's reward program to meet the merchant's needs. In yet another variation, a merchant might provide reward programs that are tailored for different types of customers as will be described in more detail hereinafter.

Table 1 and Table 2 provide a hypothetical example of a notification to a customer in accordance with embodiments of the present invention where the reward program is operated for the benefit of the merchant:

TABLE 1

| Merchant | Earned Roll Forward Credit | Credit Expires IN | Merchant Site |
|---|---|---|---|
| Kraji Czech Gourmet | $33.12 | 2 Days | czechtogo.com/rollforward |
| Otis's Bar and Grill | $2.34 | 24 Days | otisbg.com |

TABLE 2

| Merchant | Roll Forward Opportunity | Valid Through | Merchant Site |
|---|---|---|---|
| Jakes's Mexican Restaurant | 20% | Tuesday, May 16, 2006 | jakes.com/rollforward |
| Linda Tires | 10% | Sunday, Jun. 11, 2006 | lindatires.com |
| Kraji Czech Gourmet | 50% | Saturday, May 13, 2006 | czechtogo.com/rollforward |
| Otis's Bar and Grill | 33% | Monday, May 14, 2006 | otisbg.com |

This sample notification includes information on "reward" credits already assigned to the customer because of purchases made in the past (Table 1) and information on additional rewards available to the customer if the customer desires to shop at the listed merchants in the future (Table 2). Table 1 indicates the dollar credit amounts accumulated at the two merchants and the time limitations set by the merchants within which the credits must be realized. Table 2 indicates additional rewards available if future purchases are made at the two merchants listed in Table 1, plus two additional merchants. In these embodiments, the merchants set the terms associated with the reward, in this case the credit amount available to the customer and a time frame within which purchases must be made in order for the credit to be assigned.

In most embodiments, the customer does not need to present a version of the above rewards to the merchant or financial institution in print as the purchases, debits, credits, and so on all occur electronically, including the customer notifications, such as via e-mail. So the customer is able to monitor available rewards and credits to the customer's account(s) without, for example, locating and presenting coupons, or browsing catalogs.

Any number of variations of reward programs is possible with the automated reward program of the present invention. Thus, the automated reward program of the present invention enables the financial institution to offer, hypothetically, a thousand different award programs tailored for a thousand different merchants. A customer in possession of a payment device issued by the financial institution in accordance with embodiments of the present invention may make purchases at, for example, one hundred different merchants that are enrolled in the automated reward program at the financial institution, each merchant having its own tailored reward program set for the customer, and the customer may receive one hundred different types of rewards from the one hundred different merchants. All of these benefits are available without the need for additional or different point of sale (POS) hardware and/or software.

It is contemplated that the merchant reward enrollment and subsequent transaction information will be transmitted through an application service provider model. The financial institutions through which such rewards programs are implemented will likely be indifferent to the identity of the merchants provided the merchants are providing an acceptable level of quality of goods and services to the users. Once the merchants have been authorized to participate in the merchant reward program, they would simply be connected to the reward program network through a direct or indirect electrical or communications connection. It is possible that the administrator of the network would then have the ability to view or monitor all transactions conducted through the network. The financial institution would be able to work with the administrator to recruit users from the financial institution's customer base, and perhaps also recruit additional merchants.

In alternative embodiments, the automated reward system of the present invention enables the financial institution to set up reward programs tailored primarily for its own benefit. In such embodiments wherein the reward program is set up to provide incentives for the customer of the financial institution to use more of the institution's services and to become a more loyal customer of the financial institution, the system, method and program product permits a financial institution to set up and operate reward programs for all or for certain categories of the institution's customers.

Figure 3:
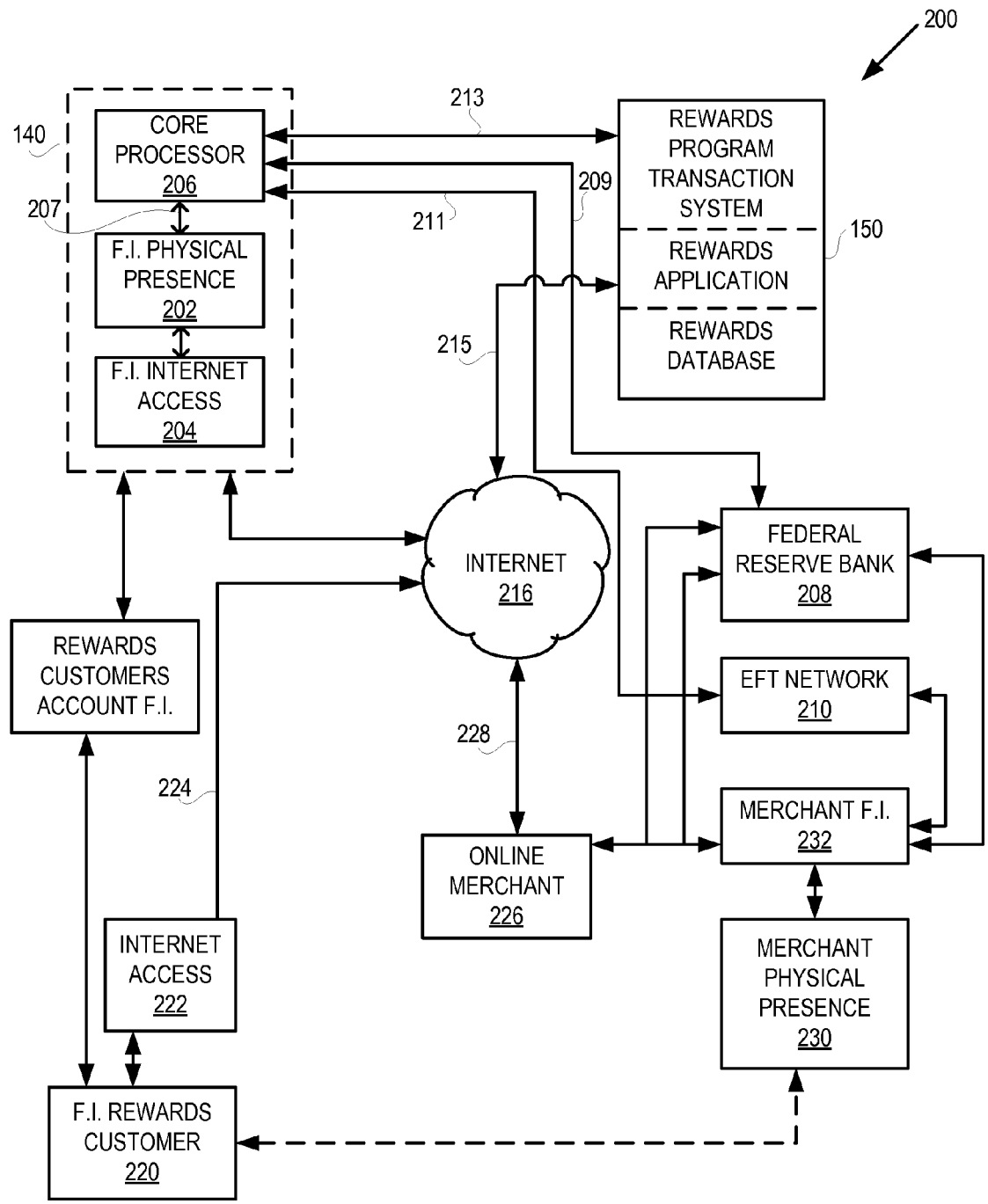
FIG. 3 is a block diagram illustration of an embodiment of the overall system for operating, through a financial institution, the reward programs, wherein the transaction module of FIG. 2 is shown as a component.

FIG. 3 depicts a system 200 for financing and managing through a financial institution reward program for its customers which uses the transaction module or system 150 of FIG. 2. The system 200 includes a financial institution 140 which may have a physical presence 202 and an internet banking presence through internet access 204 which is in electronic communication with its core processor 206, the Federal Reserve Bank system or other such ACH operator 208, and an EFT network 210 through various conventional communications channels 207, 209 and 211 of one or more communications networks for carrying data communications. The transaction module 150 is also connected to the financial institution 140 by data communication channels 213 to a local communication network in the event the transaction module resides at the financial institution 140. Alternatively, the transaction module may be located at a remote location, such as the financial institution's remote data center or at the data center of the financial institution's third party core processor. Alternately, the transaction module is located at the data center of a third party facilitator who provides services to the financial institution 140 through a communication channel 215 via a wide area communications network 216, such as the Internet, so that the steps of the method of the present invention can be implemented by the facilitator through the use of the novel reward program application 160.

A customer 220 having access 222 to the wide areas communications network 216 through a communication channel 224 may make an online purchase of either a product or service from an online merchant 226 connected through a communication channel 228 to the wide area communications network 216. Alternately, the customer may make a purchase at a merchant 230 with a physical presence by physically visiting the merchant or through a mail order process. Customers who are enrolled in a reward program operated by the financial institution may provide payment to the merchants through a variety of payment mechanisms provided the payment mechanism is associated with the customer's account at the financial institution. Such payment mechanisms include a debit card, credit card, prepaid card, payment via automatic debit from the customer's checking account, payment via PayPal, or using a mobile device and a check.

Depending on the payment mechanism used, the customer's purchase information is transmitted from the merchant via the merchant's bank 232 or various financial networks, such as an EFT network 210 or the Fedline network 208 operated by the Federal Reserve Bank or other such ACH operator, to the core processor 206 of the customer's financial institution 140 for payment by the financial institution 140 from the customer's account.

The transaction module 150 will track and maintain merchant and customer transactions and data from the core processor as related to the common automated reward program. Thus, whether the transaction module is integrated with the financial institution or separately, it will be coupled to the financial institution's databases and systems in order to carry out the automated reward program.

According to some embodiments, the reward program application 160 may be licensed as a program product on a computer readable media for use in a transaction module or computer system 150 that executes the program steps of the application program 160 to perform a method for operating a reward program through a financial institution. The program product may also contain computer-readable instructions executable by the computer system to communicate instructions to other computer systems involved in the setup and operation of the reward program through a financial institution.

FIGS. 4a-4d depict one embodiment of a process 300 for setting up and operating a reward program that are implemented by the system 200 described in FIG. 3 wherein a facilitator provides "ASP" services to the financial institution through a transaction module 150 operated by the facilitator.

Figure 4A:
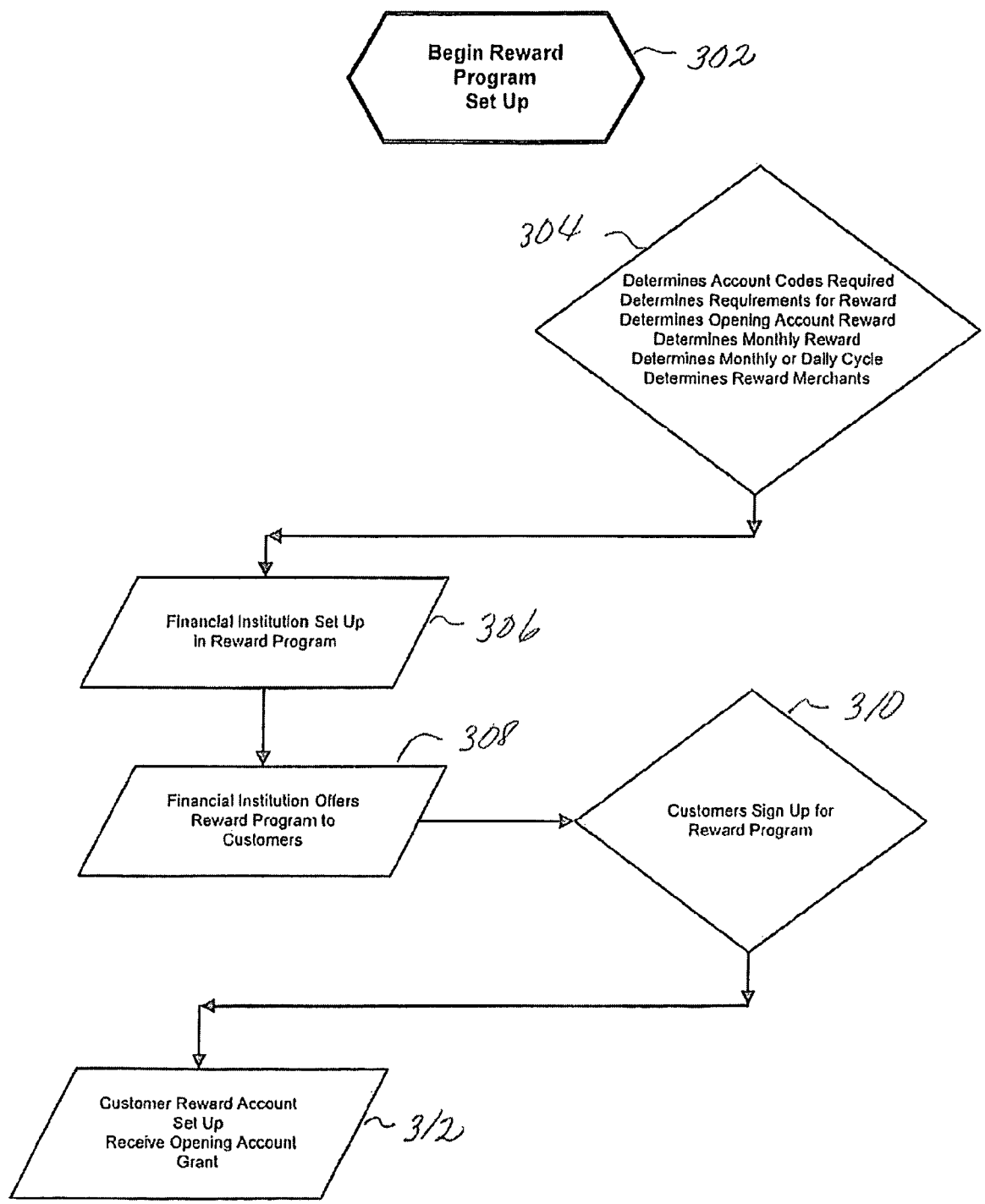
FIG. 4a is a high level process flow diagram of the steps of a method for initially setting up a reward program through a financial institution for the financial institution's customers where the primary beneficiary of the reward program is the financial institution.
Figure 7B:
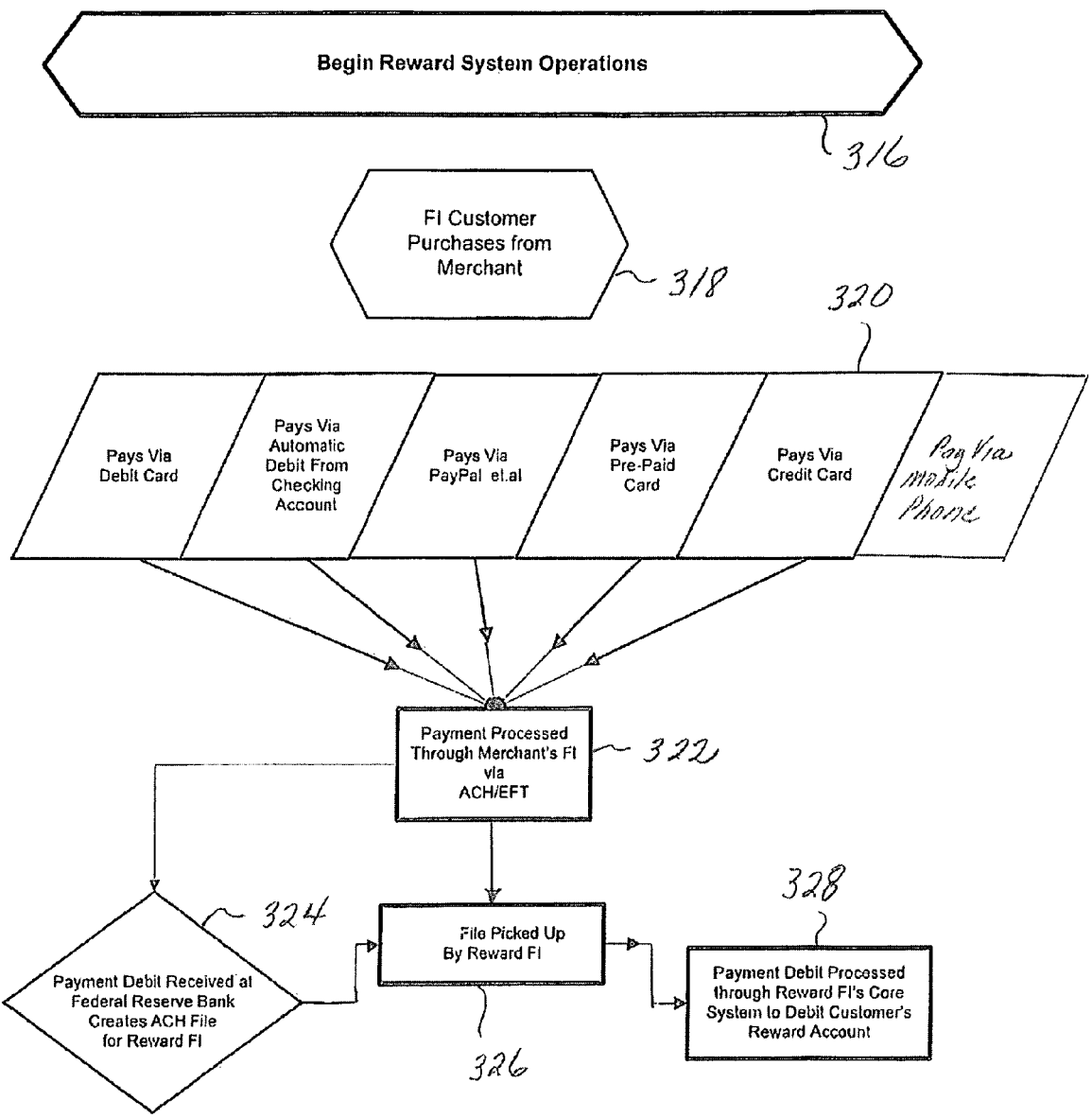

FIG. 4a depicts the process steps for setting up the method of operating a reward program through a financial institution where the financial institution is operating the award program primarily for its own benefit. In such embodiments of the present invention, the automated reward program permits the financial institution to tailor the terms of the reward program for its specific needs. For example, the financial institution may offer one or more reward programs to their customers in order to provide incentives to their customers to use more of the financial institution's services, thus creating customer loyalty to the financial institution. The financial institution may set up special reward programs for "rewards accounts" to increase the customer's use of the account wherein the customer's qualification for an award credit is based upon account activity.

The financial institution may also want to set up different "rewards accounts" for different market segments of customers where the merchants selected by the financial institution at which the customer may redeem the awards may vary depending on the particular targeted customer segment. Unlike prior reward programs, the financial institution can select the participating or qualifying merchants in each reward program without entering into an agreement with the selected merchant. In addition, the financial institution can select the qualifying merchants without notifying the qualifying merchants.

For example, a financial institution in a geographical area with a high percent of Generation Y (customers born between 1977 and 1994) may wish to provide a reward program that is particularly attractive to Generation Y. Generation Y members are between the ages of 14 and 31, numbering over 78 million people nationwide. This generation is more than three times the size of Generation X. Approximately 94% of Generation Y owns a computer and a cell phone. 60% of Generation Y owns some type of portable music and/or video device such as an iPod, have up to 30% of their music collection in digital format, and 49% download their music from the Internet. iTunes is the number one music retailer in the United States with stores only online, where Generation Y does much of their "shopping." Thus, a financial institution may desire to offer a product geared toward the Generation Y market segment based on account activity by permitting the Generation Y customer to spend their earned "reward" at a pre-defined merchant offering this product. For example, the Gen Y customers can go to any pre-defined music store, like iTunes, and purchase a download of their favorite artist. Therefore, this invention provides the Generation Y customer with "rewards" he or she wants, and provides the financial institution the means in which to provide a "rewards account" product to market to this segment of its customer base. To induce a potential or existing customer to enroll in a "rewards" account, the financial institution may grant the customer an award for taking the time to enroll in the account.

In step 302, the setup process begins. Based upon the particular market targeted by the financial institution, the financial institution in step 304 may initially make the following determinations:
i) Account codes required
ii) Requirements for rewards
iii) Initial Award for Opening Account
iv) Amount of Periodic (Monthly) Award
v) Determine Reward Cycle
vi) Determine Merchants at which reward credit may be redeemed.

In step 306, the financial institution inputs these parameters of the reward program application 160 into the database 162 in the transaction module 150 to set up the reward program. In step 308, the financial institution offers the reward program to both existing and new customers. In step 310, a customer enrolls in the reward program. The customer may enroll in the reward program on a web site over the internet, by a mobile device or at a financial institution's physical locations. The enrollment may include setting up a financial institution "reward" account for the customer, if such account is not already established and, if such an account is already established, registering that account in the reward program. In step 312, the customer reward account is set up by inputting specific customer-specific data, including the account number and the type of account. A reward account may be any account, prepaid card, credit card, or any other account device which can identify the customer and/or the reward recipient and be used to make purchases. Upon setting up the account, the financial institution may grant an initial opening account award credit to the customer in step 312.

In FIG. 4b, step 316 depicts the beginning of the reward program system operations. Initially, the customer in step 318 purchases goods or services from a merchant who has previously been selected by the financial institution and input into the reward program database 162 as a qualifying merchant. The customer may pay the merchant for the goods and/or services using a variety of methods 320 so long as the payment is associated with the customer's "reward" account at the financial institution. Such payment methods include, but are not limited to, payment by debit card, credit card or prepaid card; payment through a third party such as PayPal; other mobile device or payment via an automatic debit from the customer's financial institution account.

In step 322, the payment may be processed through the merchant's financial institution directly or indirectly via an ACH or EFT file transfer. Step 326 depicts the file sent to the financial institution. If the payment was an ACH transfer, in step 324, the payment debit is received at the Federal Reserve Bank or other ACH operator, which creates an ACH file for sending the payment through communication link 209 shown in FIG. 3 to the core processor 206 of the financial institution 140 which operates the reward program. If the payment is a POS transaction, the payment debit is received by the core processor 206 via communication link 211 from an EFT network 210. In step 328, the payment debit is processed through the core processor 206 to debit the customer's "reward" account.

Figure 4C:
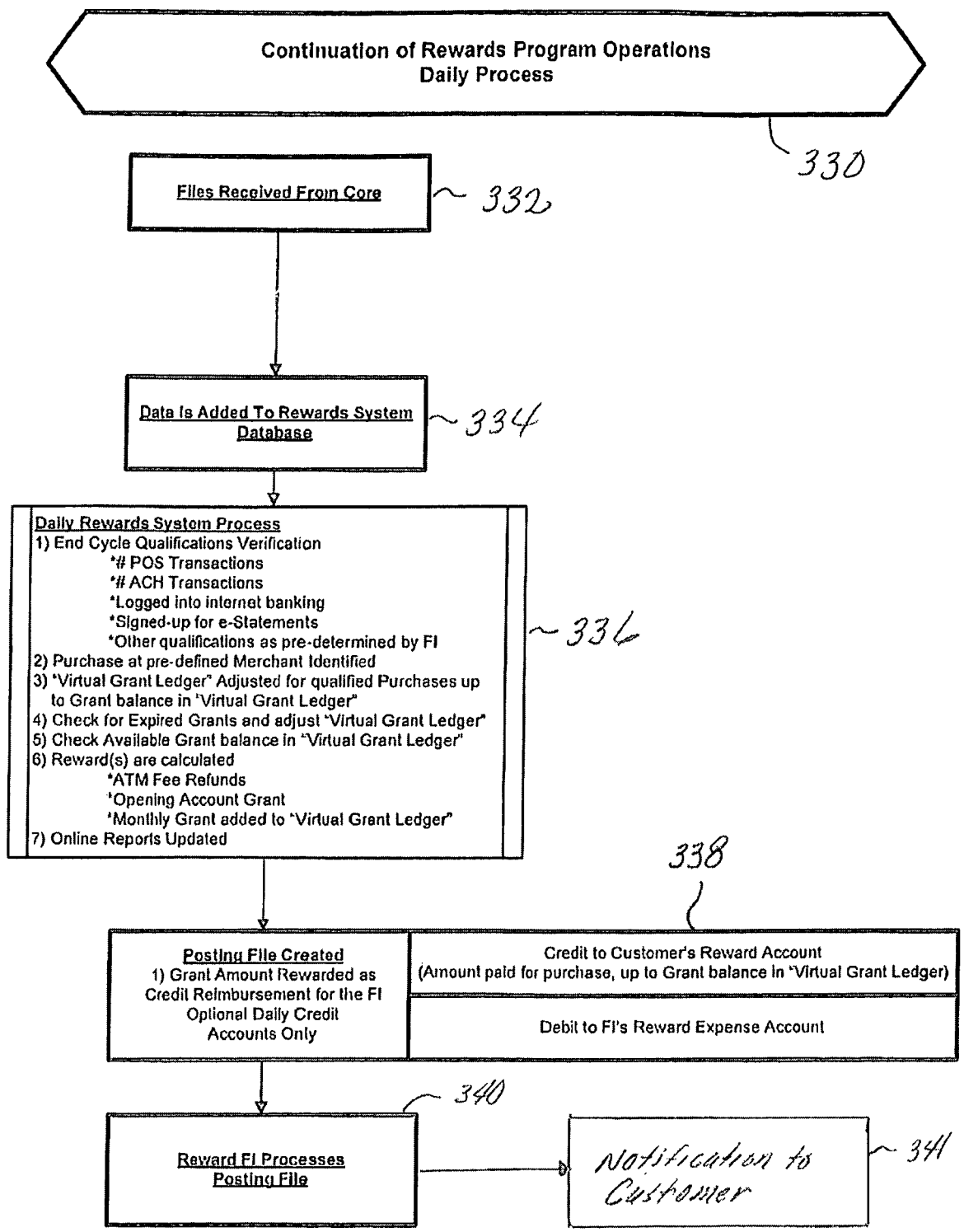
FIG. 4c is a continuation of the high level process flow diagram of FIG. 4b for carrying out reward programs showing the steps in the financial institution's daily operations.

In FIG. 4c, step 330 depicts the beginning of the daily process portion of the reward program operations. In step 332, the payment debit file is received by the transaction module 150 from the core processor 206 of the financial institution 140 operating the reward program. In step 334, the payment debit file data is added to the reward program database 162. In step 336, the reward program application 160 commences the daily rewards program system processes which may include, but is not limited to, the following:

Daily Rewards System Process
i. End Cycle Qualifications Verification
 # POS Transactions
 # ACH Transactions
 Logged into internet banking
 Signed-up for e-Statements
 Other qualifications as pre-determined by FI
ii. Purchase at pre-defined Merchant Identified
iii. "Virtual Grant Ledger" Adjusted for qualified Purchases up to Grant balance in "Virtual Grant Ledger"
iv. Check for Expired Grants and adjust "Virtual Grant Ledger"
v. Check Available Grant balance in "Virtual Grant Ledger"
vi. Reward(s) are calculated
 ATM Fee Refunds
 Opening Account Grant
 Monthly Grant added to "Virtual Grant Ledger"
vii. Online Reports Updated
viii. Automatic notification communicated to customer If the date is the end of the award program qualification processing cycle, the transaction module 150 initiates an "end cycle qualifications verification" as will be described in more detail later. If the date is not the end of the cycle, the module 150 proceeds to the next processing step. The transaction module 150 then identifies any purchase made by the customer at a pre-defined or qualifying merchant. The transaction module then adjusts the "virtual grant ledger" or "virtual account" created and maintained by the transaction module for each customer reward program account. The module 150 then checks for any expired reward credits and adjust the "virtual grant ledger" for that amount accordingly. The module 150 then checks the available reward credits balance posted in the "virtual grant ledger." The module then calculates whether any new award credits should be granted. Such new rewards credits may include any initial grant for opening the account or any other such rewards that the financial institution may make a part of the rewards program. If, in one embodiment, the financial institution determines that the end of the qualification verification cycle is a daily cycle, the transaction module calculates whether the customer is entitled to any "end of qualification cycle" grant of reward credits by having met the qualification criteria. The transaction module then makes adjustments if any "reward credits" are to be added to the "virtual grant ledger." The transaction module then updates the online status reports that may be accessed by the financial institution, the merchant, the customer, and/or the facilitator. In step 338, the transaction module then creates a posting file to send to the financial institution's core processor to update all accounts. In step 341, notification may be sent to the customer of new reward credits earned, reward credits used, reward credit balance, and any other suitable information.

The transaction module sends a file to the core processor to instruct the core processor 206 to (i) credit the customer's "reward" account the amount paid for any purchase, up to the reward credit balance prior to today's credits earned in the virtual grant ledger for the customer account and (ii) debit the financial institution's reward program expense account. In step 340, the financial institution 140 operating the reward program posts the debits and credits to the accounts pursuant to the instructions received from the transaction module.

Figure 4D:
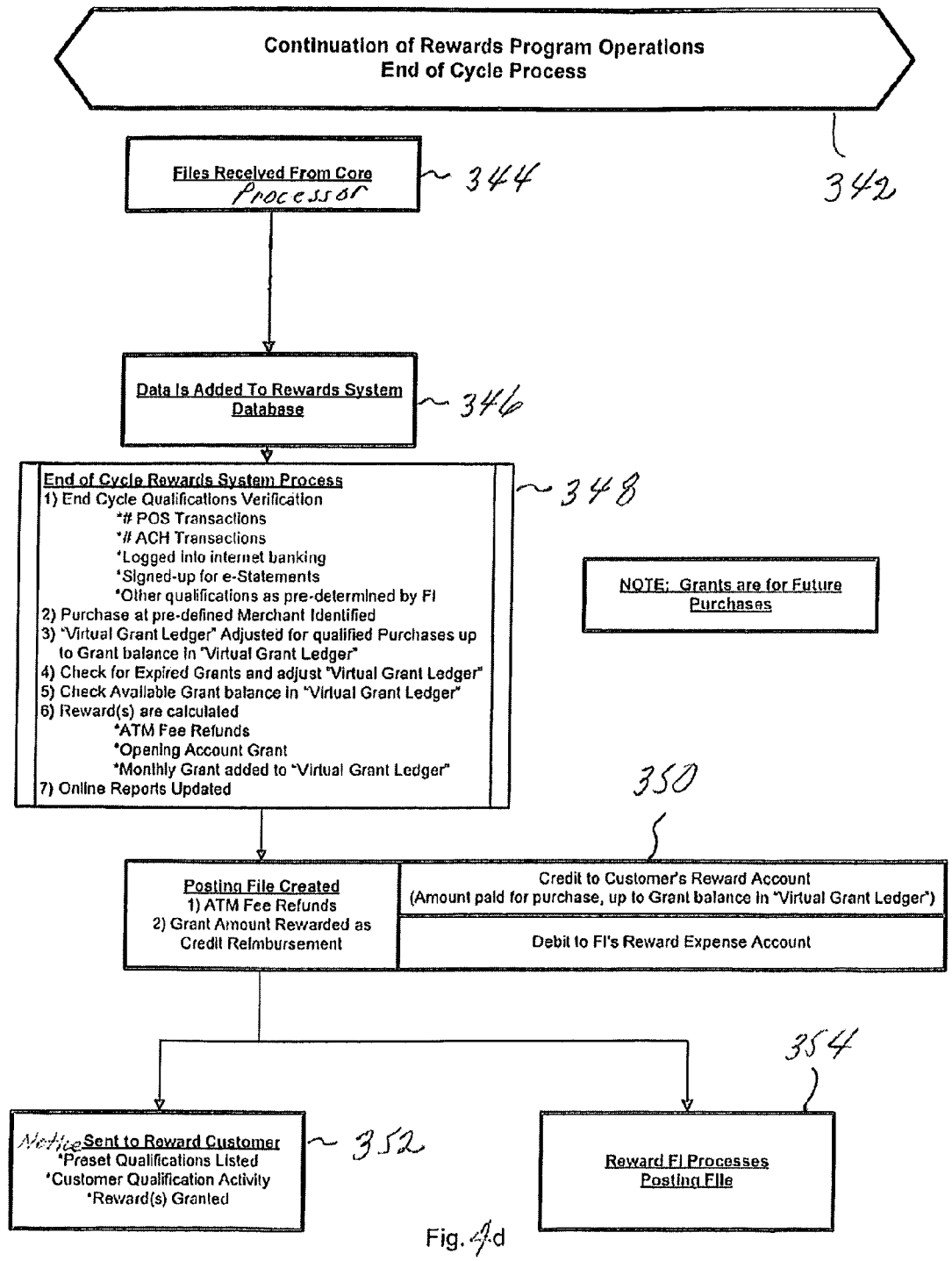
FIG. 4d is a continuation of the high level flow diagram of FIG. 4c showing the end of cycle process steps for carrying out the reward program.

In FIG. 4d, step 342 depicts the beginning of the "end of qualification cycle" process portion of the reward program operations. In step 344, the payment debit file is received by the transaction module 150 from the core processor 206 of the financial institution 140 operating the reward program as previously described in connection with the daily process. In step 346, the payment debit file data is added to the reward program database 162. In step 348, the reward program application 160 commences the rewards program system processes previously described in connection with the daily process portion of the reward program operations except as described hereinafter. When the date is the end of the qualification cycle, the transaction module determines if the customer has met the financial institution's qualification criteria for an end of cycle award of reward credits. Such qualification criteria may include meeting certain account activity requirements. Such account activity requirements may include the following:

i. A specified number of POS Transactions
ii. A specified number of ACH Transactions
iii. The customer has logged into the financial institution's internet banking portal
iv. The customer has signed-up for e-statements in lieu of the institution having to send physical statement by mail to the customer; and
v. Other qualifications as predetermined by the financial institution.

The transaction module then repeats the processing steps done on a daily process except to the extent as described below for the end of cycle processing.

If the date is the end of the qualifications verification cycle, the module calculates whether the customer is entitled to any "end of qualification cycle" grant of reward credits, such as ATM Fee Refunds, by having met the qualification criteria. When the transaction module is calculating the new reward credits to be granted, the transaction module grants "end of cycle" reward credits if the transaction module can verify that the customer account has met all the end of cycle qualification criteria set up for that customer account. In some embodiments, the reward credits can be variable and based separately, such as $2.00 reward credit for qualifying activity A, and $4.00 reward credit for qualifying activity A and B.

In step 350, the transaction module then creates a posting file to send to the financial institution's core processor to update all accounts. The transaction module sends a file to the core processor to instruct the core processor to (i) credit the customer's "reward" account any amount paid for any purchase, up to the reward credit balance prior to today's earned credits, in the virtual grant ledger for the customer account and for any ATM Fee Refunds that the financial institution may make part of the rewards program and (ii) debit the financial institution's reward program expense account. In step 352, the transaction module may send a notification to the customer to inform the customer of the status of his or her reward account, such as the qualification criteria needed to be met, whether the customer met the qualification activity, the total number of reward credits earned during the qualification cycle, the amount of reward credits used by the customer, and the remaining balance of award credits available. The financial institution may program the reward program application 160 in the transaction module such that the customer may only apply granted reward credits to future purchases.

In step 354, financial institution 140 operating the reward program posts the debits and credits to the customer's real reward account set up by the financial institution pursuant to the instruction file received from the transaction module 150.

Figure 5A:
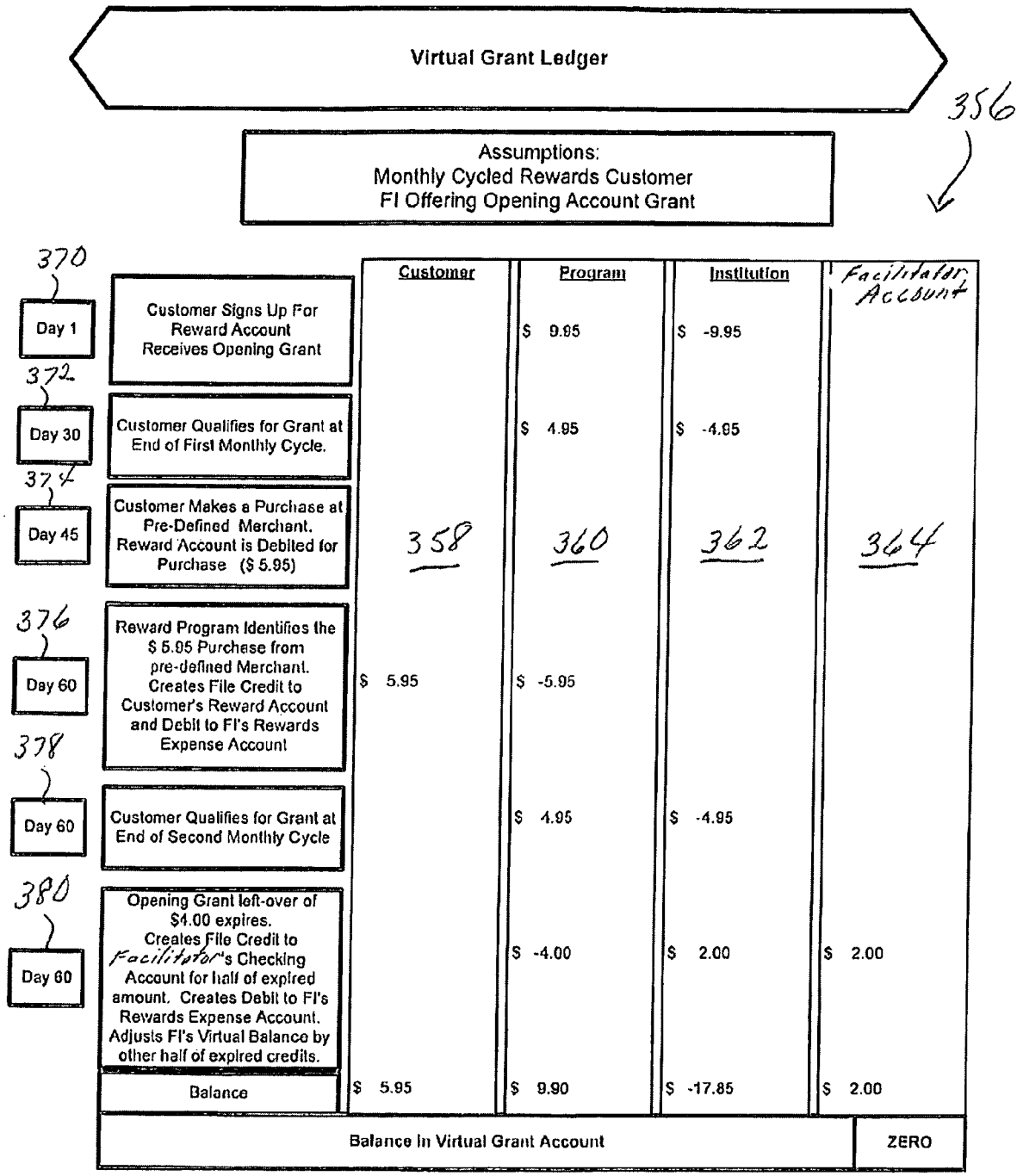
FIG. 5a is a diagrammic representation of a virtual account created by the reward program transaction module of FIG. 2.
Figure 5:
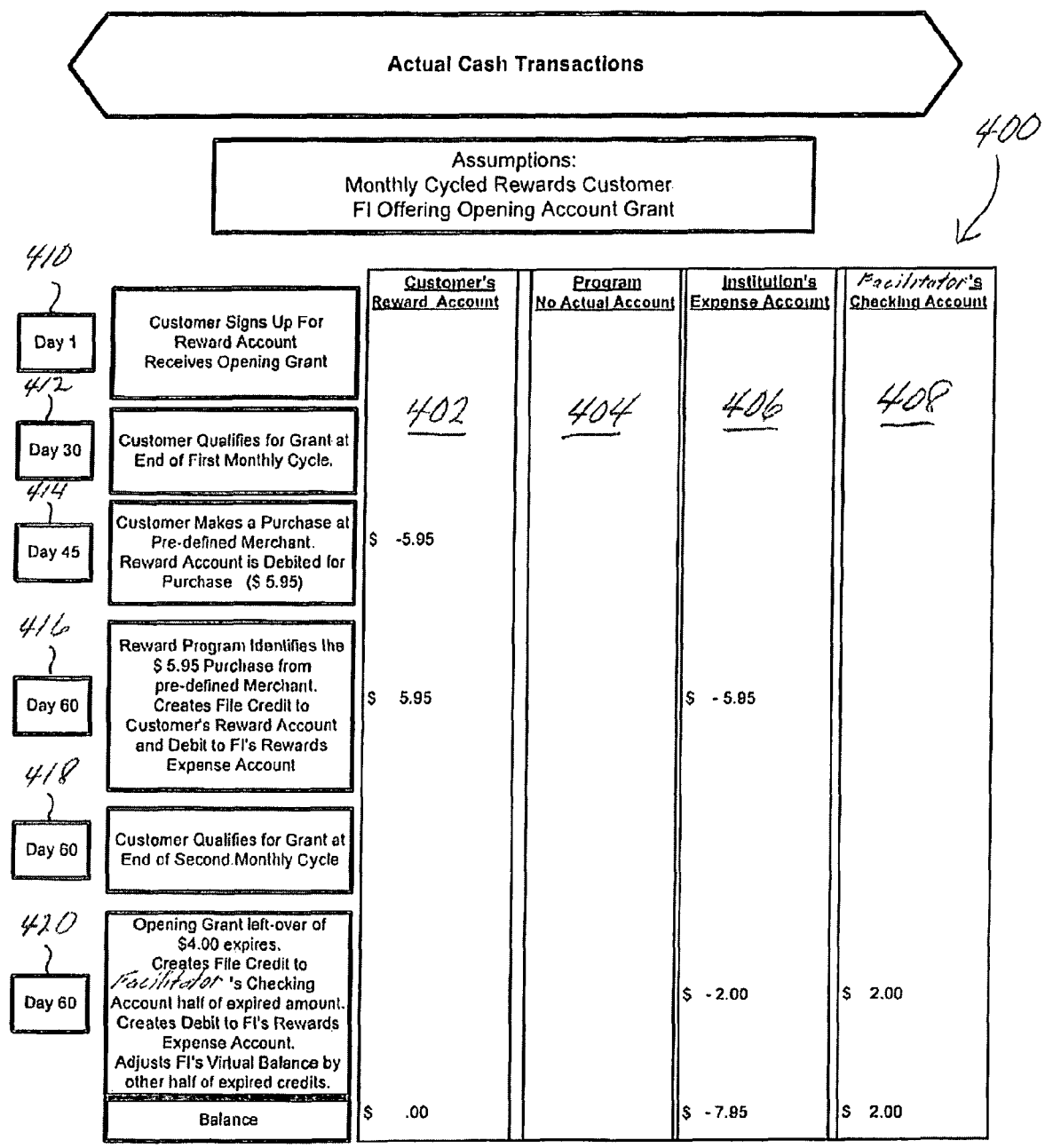
FIG. 5b is a representation of the actual reward account of the financial institution operating the reward program using the system of FIG. 3

FIG. 5a depicts an example of a "virtual grant ledger" 356 created and maintained by the transaction module 150 for a customer "reward" account. The ledger may include the following columns: column 358 to track customer purchases, column 360 to track customer reward grants, column 362 to track financial institution customer-related reward program expenses, and column 364 to track payments to any facilitator for providing reward program services through a transaction module operated by the facilitator.

The depicted virtual grant ledger 356 assumes that the qualification cycle for determining if the customer is entitled to award credits is a monthly cycle. In addition, the ledger assumes that the financial institution grants the customer "award credits" upon the customer enrolling in a "reward" account. The example further assumes that the transaction module is operated by a facilitator for the financial institution, and the facilitator is granted a fee for providing the reward program services via an ASP model.

In step 370, on day 1 when the customer signs up for the reward account the transaction module posts a credit of $9.95 to the customer reward account program column 360 as an opening account grant of rewards and a corresponding debit of $9.95 to the institution's reward account column 362.

In step 372, on day 30 (the end of the first qualification cycle), the customer qualifies for a grant of $4.95 for meeting the qualification criteria during the first qualification cycle, a credit of $4.95 is posted to the customer reward account program column 360, and a debit of $4.95 is posted to the financial institution account column 362.

In step 374, the customer on day 45 makes a purchase at a pre-defined or qualifying merchant in the amount of $5.95.

In step 376, the reward program transaction module on day 60, which is the end of a monthly cycle, identifies the $5.95 purchase from the qualifying merchant and creates a file credit to the customer's reward grant column 358 and a debit to the reward program column 360.

In step 378, the customer qualifies for a grant of $4.95 in reward credits on day 60 because the account qualifies for reward credits at the end of the second monthly qualification cycle, $4.95 is credited to the customer reward grants column 360, and $4.95 is debited to the financial institution expense column 362.

In step 380, the remaining unused portion of the reward credit granted for opening the account equal to $4.00 expires on day 60. In one embodiment, the transaction module creates a file debit of $4.00 to the customer's reward account program column 360, a file credit of $2.00, or one half of the expired reward, to the financial institution's column 362, and a file credit of $2.00, or one half of the expired reward credit, to the facilitator's account in column 364 for payment of the facilitator fees for operating the reward program for the financial institution. Thus, the financial institution receives the "breakage" associated with a customer's unused or expired reward credits and uses one-half of them to pay the facilitator for the facilitator's reward program services. It should be noted, however, that the facilitator fees may be calculated and paid by other suitable methods. FIG. 5a now shows a remaining credit balance of $9.90 to the customer's reward program column, which may be applied to future purchases at any pre-defined merchant.

FIG. 5b depicts an example of the actual cash transactions ledger 400 created and maintained by the financial institution 140 for a customer "reward" account. Such a ledger may include the following columns: column 402 to track customer purchases, column 404 to track customer reward grants, column 406 to track financial institution customer-related reward program expenses, and column 408 to track payments to any facilitator for providing services through a transaction module operated by the facilitator.

The depicted ledger 400 assumes that the qualification cycle for determining if the customer is entitled to an award is a monthly cycle. In addition, the ledger assumes that the financial institution grants the customer "award credits" upon the customer enrolling in a "reward" account. The example further assumes that the transaction module is operated by a facilitator for the financial institution and the facilitator is granted a fee that is a percentage of the "breakage" for providing the financial institution the reward program services via a ASP model.

In step 410, on day 1 when the customer signs up for the reward account, no transaction is recorded in the financial institution actual customer "rewards" account ledger in its expense column because the rewards credit of $9.95 to the customer reward account may expire before it is used. It should be noted, however, that the financial institution may elect to "accrue" these rewards for general accepted accounting principles ("GAAP") purposes on a, for example, percentage of reward credits basis, in which case the transaction module 150 will create the daily or monthly cycle posting file to credit the financial institution's rewards accrual account and debit the financial institution's rewards expense account.

In step 412, on day 30 (the end of the first qualification cycle), the customer grant of $4.95 for meeting the qualification criteria for a reward grant is not posted in the financial institution's expense column because the customer reward may expire before it is used.

In step 414, the customer on day 45 makes a purchase at a pre-defined or qualifying merchant and actual reward account column 402 is debited for the purchase.

In step 416, the reward program transaction module on day 60 identifies the $5.95 purchase from the qualifying merchant and creates a file credit of $5.95 to the customer's reward account column 402 and a debit to the financial institution's rewards expense account column 406.

In step 418, the customer qualifies for a grant of reward credits on day 60 because it is the end of the second monthly qualification cycle; however there are no postings to the ledger 400 because the reward credits may expire.

In step 420, the remaining unused portion of the reward credit granted for opening the account equal to $4.00 expires on day 60. The transaction module creates a file debit of $2.00, or one half of the expired reward, to the bank's expense column 362, and a file credit of $2.00, or one half of the expired reward credit, to the facilitator's checking account in column 408 for payment of the facilitator fees for operating the reward program for the financial institution.

The end of cycle balance for the customer actual reward accounts ends with a zero balance in the customer reward account, a debit of $7.95 to the institution's expense account column, and a $2.00 credit to the facilitator's checking account for half of the expired reward credit as part of its fees for operating the reward program for the financial institution.

In summary, embodiments of the present invention permit financial institutions to use current POS technology and networks to operate the reward program. The financial institution also can establish its own rewards program to offer its customers reward credits to purchase goods or services from merchants attractive to the customer segment without having to enter into costly pre-arranged agreements with the merchants set up in the reward program. The reward accountholder can be a payment cardholder, deposit accountholder, prepaid cardholder or have any other such account whereby the customer can make purchases.

In operating a reward program for the Generation Y example previously discussed, the reward program may operate as set forth below. The Generation Y accountholder customer qualifies via account activity for a "reward credit." This reward credit is posted to and tracked via a "virtual grant ledger" amount which can be redeemed at any merchant set up as a pre-defined or qualifying merchant in the reward program for the Generation Y segment. The Generation Y customer spends their earned "reward" at the pre-defined merchant. For example, the Generation Y customers can go to a pre-defined online music store, like iTunes, and purchase a download of their favorite artist.

The transaction module of the present invention receives the purchase information relating to the purchase over various networks, identifies the qualifying purchase transaction with the qualifying merchant, and credits the Generation Y customer's reward account up to the amount of their "virtual grant ledger" balance. At the same time, this invention will debit the financial institution's expense account to balance out the transaction.

Any "virtual grant" not spent within a set timeframe (expiration) is not expensed, whereby "breakage" may be kept by the financial institution, not the merchant nor any other third party entity. The transaction module also creates a cycled notification, such as an email or text message and an online report to the customer with grant, reward and qualification requirement information, so customer is aware of account and reward activity and status.

Therefore, this example of the present invention provides the Generation Y customer of the financial institution with the type of rewards he or she wants, and provides the financial institution the means in which to provide reward accounts to market to this segment of their customer base.

Rewards can be "Virtual Grant," "Virtual Cash," "Points" or any other such rewards that can either be redeemed for purchases or reimbursed after a purchase has been made. The qualifying merchant can be an online merchant's website, catalog, a merchant's physical store or any other merchant where products and/or services can be purchased.

Thus, the embodiments of the present invention enable financial institutions to set up and operate "reward programs" for their customers that a) use existing POS technology, (b) for specific customer markets which grants "rewards" that can be redeemed at any financial institution-designated merchants without costly, pre-arranged merchant agreements or interferences from the merchant or any other third-party and c) where the financial institution keeps the "breakage". The present invention also provides the financial institution reward account customers with timely and recurring information about their rewards account and activity; provides its customers with the right and ability to transfer earned rewards to another account, and makes it easy for its customers to redeem the earned rewards.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. It is therefore, contemplated that the claims will cover any such modifications or embodiments that fall within the true scope of the invention.

What is claimed is:

1. An automated method of operating a rewards program through a financial institution, comprising:
    enrolling a plurality of customers from a particular customer market segment or category having at least one account with the financial institution in the rewards program, wherein if an account of one of the customers associated with the rewards program meets certain qualifying criteria the one customer receives one or more reward credits in monetary units associated with the account;
    selecting at least one merchant as a qualifying merchant in the rewards program which provides products or services attractive to customers from the particular customer market segment or category, wherein the financial institution selects to include the merchant as a qualifying merchant in the rewards program independently of the merchant choosing to participate in the rewards program;
    wherein the method includes a transaction module for:
        determining if the account qualifies for a reward credit;
        assigning a reward credit to the account if the account qualifies for a reward credit;
        receiving purchase information regarding a purchase made at a merchant by the one customer wherein the payment for such purchase is associated with the account;
        identifying from the purchase information whether the purchase was made at a qualifying merchant for the rewards program; and
        applying the reward credit towards the purchase made by the one customer at the at least one qualifying merchant by applying the reward credit to the one customer's account based upon business rules applicable to the rewards program.

2. The method of claim 1, wherein the business rules applicable to the rewards program provide that the assigned reward credits will expire if not utilized within certain time limitations and the method further comprises:
    determining if a reward credit has expired.

3. The method of claim 2, wherein the financial institution pays the one or more reward credits to the one customer without repayment from the at least one qualifying merchant, so that the financial institution receives a benefit of any unused or expired reward credits that are not applied to the one customer's account.

4. The method of claim 1, wherein:
    selecting at least one merchant as a qualifying merchant in the rewards program comprises
        selecting a merchant as a first qualifying merchant and selecting another merchant as a second qualifying merchant in the rewards program wherein the financial institution selects to include the first and second qualifying merchants in the rewards program independently of the merchants choosing to participate in the rewards program;
    the business rules of the reward program permit the one customer to redeem rewards credits at a predefined qualifying merchant selected from the first and second qualifying merchants toward a future purchase at the predefined qualifying merchant;
    the transaction module step of receiving comprises:
        receiving purchase information regarding a first purchase made at the first qualifying merchant and regarding a second purchase made at the second qualifying merchant wherein the payments for such purchases is associated with the account and further includes the step of identifying from the purchase information whether the purchases were made at the first qualifying merchant or the second qualifying merchant; and
    the transaction module step of applying comprises:
        applying a reward credit toward a future purchase made by the one customer at the predefined qualifying merchant.

5. The method of claim 1, wherein the step of receiving purchase information comprises:
    receiving purchase information each time the one customer uses the account to pay for a purchase at a merchant.

6. The method of claim 1, wherein the selecting of the merchant as a qualifying merchant in the rewards program includes the financial institution selecting to include the qualifying merchant in the rewards program without entering into an agreement regarding the rewards program with the qualifying merchant.

7. The method of claim 1, wherein the selecting of the merchant as a qualifying merchant in the rewards program includes the financial institution selecting to include the qualifying merchant in the rewards program without notifying the qualifying merchant regarding the rewards program.

8. The method of claim 1, wherein the financial institution is a bank or credit union, the account is a conventional banking account, and the financial institution sets the qualification criteria for when the customer's account is entitled to a reward credit so that the customer is provided with incentives to use more of the financial institution's services.

9. The method of claim 8, wherein the qualification criteria for a reward credit is based upon account activity not limited to debit or credit card transactions.

10. The method of claim 1, wherein the financial institution sets the business rules applicable to the rewards program for applying the reward credits.

11. The method of claim 1, wherein the one customer is issued a payment device associated with the one customer's account to provide payment to the qualifying merchant but the customer may provide payment to the qualifying merchant using a variety of payment mechanisms not limited to the use of the payment device.

12. The method of claim 1 wherein the one customer is provided notice of a status of the one customer's reward account, including at least one of i) the reward credits earned by the one customer's account and ii) the amount of reward credits applied to the one customer's account during a period.

13. The method of claim 1, wherein the financial institution establishes a plurality of rewards programs for different customer categories and selects different qualifying merchants, qualification criteria, or business rules for different customer categories.

14. The method of claim 1, further comprising repeating the steps of assigning, receiving, identifying and applying on an ongoing basis for purchases by the plurality of customers, wherein the plurality of customers have accounts at the financial institution.

15. A system in communication with a core processing system for operating a rewards program through a financial institution for granting reward credits to customers having an account at the financial institution, comprising:
 circuitry for receiving from and transmitting to the core processing system information about the financial institution customers' accounts and account activity, including purchase information about purchases made at a plurality of merchants by customers through accounts associated with the financial institution;
 a transaction module coupled to the core processing system for managing enrollment in and transactions associated with the rewards program, wherein the transaction module comprises:
  a memory unit operable for storing a computer program for operating the rewards program; and
  a processor coupled to said memory unit, wherein said processor, responsive to said rewards computer program, comprises:
  circuitry for enrolling a plurality of customers from a particular customer market segment having at least one account with the financial institution in the rewards program, wherein if an account of one of the customers associated with the rewards program meets certain qualifying criteria the one customer receives one or more reward credits in monetary units associated with the account;
  circuitry for receiving a selection to include at least one merchant as a qualifying merchant in the rewards program which provides products or services attractive to the particular customer market segment, wherein the selection of the at least one qualifying merchant is independent of the merchant choosing to participate in the rewards program;
  circuitry for determining if a customer's account is associated with the rewards program;
  circuitry for determining if the account qualifies for a reward credit based upon the qualification criteria;
  circuitry for instructing the financial institution to assign a reward credit to the account if the account qualifies for a reward credit;
  circuitry for receiving purchase information regarding a purchase made at a merchant which is associated with the customer's account;
  circuitry for identifying from the purchase information whether the purchase was made at a qualifying merchant for the rewards program; and
  circuitry for instructing the financial institution to apply a reward credit towards the purchase made by the customer at the at least one qualifying merchant based upon business rules applicable to the rewards program; and
 wherein the financial institution credits a reward credit or debits a reward credit to the financial institution customer's account in response to instructions from the transaction module.

16. The system of claim 15, wherein the business rules applicable to the rewards program provide that the assigned reward credits will expire if not utilized within certain time limitations and the processor further includes circuitry that determines if a reward credit has expired.

17. The system of claim 16, wherein the processor further includes circuitry that creates a virtual account for tracking on an individual account basis the reward credits associated with each account associated with the rewards program and the transaction module debits a customer's virtual account if a reward credit is expired and instructs the financial institution to credit the financial institution's account for such credit.

18. The system of claim 15, wherein:
 the circuitry for selecting the at least one merchant as a qualifying merchant in the rewards program comprises:
  circuitry for selecting a merchant as a first qualifying merchant and selecting another merchant as a second qualifying merchant in the rewards program wherein the selection of the first and second qualifying merchants in the rewards program is made independently of the merchants choosing to participate in the rewards program;
 the business rules of the reward program permit a customer in the reward program to redeem rewards credits at a predefined qualifying merchant selected from the first and second qualifying merchants toward a future purchase at the predefined qualifying merchant;
 the circuitry for receiving comprises:
  circuitry for receiving purchase information regarding a first purchase made at the first qualifying merchant and regarding a second purchase made at the second qualifying merchant wherein the payments for such purchases are associated with the account and for identifying from the purchase information whether the purchases were made at the first qualifying merchant or the second qualifying merchant; and
 the processor further includes circuitry that applies a reward credit only toward a future purchase by the customer at the predefined qualifying merchant.

19. The system of claim 15, wherein the circuitry for receiving a selection to include a merchant as a qualifying merchant in the rewards program includes circuitry for receiving the selection from the financial institution.

20. The system of claim 19, wherein the financial institution selects a qualifying merchant for a rewards program without entering into an agreement regarding the rewards program with the qualifying merchant.

21. The system of claim 19, wherein the financial institution selects a qualifying merchant for a rewards program without notifying the qualifying merchant.

22. The system of claim 15, wherein the financial institution is a bank or credit union, the account is a conventional banking account, and the financial institution sets the qualification criteria for when the account is entitled to a reward credit so that the customer is provided with incentives to use more of the financial institution's services.

23. The system of claim 22, wherein the qualification criteria for a reward credit is based upon account activity not limited to debit or credit card transactions.

24. The system of claim 15, wherein the financial institution sets the business rules applicable to the rewards program for applying the reward credits to purchases made by the customer.

25. The system of claim 15, wherein the financial institution issues the customer a payment device associated with the customer's account for making purchases, but the customer may provide payment to a qualifying merchant using a variety of payment mechanisms not limited to the use of the payment device.

26. The system of claim 15, wherein the processor included circuitry for creating a notification to the customer of the status of the customer rewards account and the transaction module provides notification of the status of the customer rewards account, including at least one of i) reward credits earned and ii) the amount of reward credits applied to the customer account during a period.

27. The system of claim 15, wherein the financial institution is capable of establishing a plurality of rewards programs through the transaction module for different customer market segments or categories and select different qualifying merchants, qualification criteria, or business rules for different customer categories.

28. The system of claim 15, wherein the transaction module processor comprises circuitry for repeating the processing steps of assigning, receiving, identifying and applying on an ongoing basis for purchases by the plurality of customers having accounts at the financial institution associated with the rewards program.

29. A computer program product containing program instructions for execution on a computer system in communication with a financial institution core processing system, which when executed by the computer system, causes the computer system to perform a method for operating a rewards program through the financial institution, said method comprising:

enrolling a plurality of customers from a particular customer market segment or category having at least one account with the financial institution in the rewards program wherein if an account of one of the customers associated with the rewards program meets certain qualifying criteria the one customer receives one or more reward credits in monetary units associated with the account;

selecting to include the at least one merchant as a qualifying merchant in the rewards program which provides products or services to customers from the particular customer market segment or category, wherein the financial institution selects to include the qualifying merchant in the rewards program independently of the merchant choosing to participate in the rewards program;

determining if the account qualifies for an award credit;

assigning a reward credit to the account if the account qualifies for an award credit;

receiving purchase information regarding a purchase made at the at least one merchant by the one customer wherein the payment for the purchase is associated with the account;

identifying from the purchase information whether the purchase was made at the at least one qualifying merchant for the rewards program; and applying the reward credit towards the purchase made by the one customer at the at least one qualifying merchant by applying the reward credit to the one customer's account based upon business rules applicable to the rewards program.

30. The computer program product of claim 29, wherein the business rules applicable to the rewards program provide that the assigned reward credits will expire if not utilized within certain time limitations and the method further comprises:

determining if a reward credit has expired.

31. An automated method of operating a rewards program through a financial institution, comprising:

enrolling a plurality of customers from a particular customer market segment or category having at least one account with the financial institution in the rewards program, wherein if an account of one of the customers associated with the rewards program meets certain qualifying criteria the one customer receives one or more reward credits in monetary units associated with the account;

selecting a merchant as a first qualifying merchant in the rewards program, selecting another merchant as a second qualifying merchant in the rewards program;

wherein the financial institution selects to include the merchants as first and second qualifying merchants in the rewards program independently of the merchants choosing to participate in the rewards program and wherein the business rules of the reward program permit the one customer to redeem rewards credits associated with qualifying merchants toward a subsequent purchase at a predefined qualifying merchant designated by the customer from the first and second qualifying merchants;

wherein the method includes a transaction module for:
determining if the account qualifies for a reward credit;
assigning a reward credit to the account if the account qualifies for a reward credit;
receiving purchase information regarding a first purchase made at the first qualifying merchant and regarding a second purchase made at the second qualifying merchant wherein the payments for such purchases is associated with the account;
identifying from the purchase information whether the purchases were made at the first qualifying merchant or the second qualifying merchant;
reporting to the one customer reward credits granted due to purchases made by the one customer during an account cycle at each of the qualifying merchants;
the one customer designating a qualifying merchant for applying the reward credits earned at the predefined qualifying merchant during the cycle towards a third purchase made by the one customer at the predefined qualifying merchant;
receiving purchase information about a third purchase by the one customer at the predefined qualifying merchant;
applying the reward credits associated with the designated qualifying merchant to the third purchase at the predefined qualifying merchant if the purchase is made before the expiration of the reward credits.

* * * * *